United States Patent
Cieslak et al.

(10) Patent No.: US 12,034,599 B2
(45) Date of Patent: *Jul. 9, 2024

(54) DEVICE CONFIGURATION PARAMETER DETERMINATION

(71) Applicant: Snap Inc., Santa Monica, CA (US)

(72) Inventors: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 17/513,556

(22) Filed: Oct. 28, 2021

(65) Prior Publication Data

US 2022/0052918 A1    Feb. 17, 2022

Related U.S. Application Data

(63) Continuation of application No. 16/418,135, filed on May 21, 2019, now Pat. No. 11,240,104.

(51) Int. Cl.
*H04L 41/0866* (2022.01)
*H04L 41/084* (2022.01)
*H04L 67/01* (2022.01)

(52) U.S. Cl.
CPC ...... *H04L 41/0846* (2013.01); *H04L 41/0866* (2013.01); *H04L 67/01* (2022.05)

(58) Field of Classification Search
CPC ............ H04L 41/0873; H04L 41/0866; H04L 41/0846; H04L 67/125; H04L 67/303; H04L 67/01

See application file for complete search history.

(56) References Cited

U.S. PATENT DOCUMENTS

| | | |
|---|---|---|
| 7,346,512 B2 | 3/2008 | Li-Chun et al. |
| 8,224,308 B1 | 7/2012 | Gavrylyako et al. |
| 8,584,114 B2 | 11/2013 | Rabinovich et al. |
| 10,242,193 B1 | 3/2019 | Babun et al. |
| 10,868,788 B1 | 12/2020 | Underwood et al. |
| 11,240,104 B1 | 2/2022 | Cieslak et al. |
| 2002/0178241 A1 | 11/2002 | Eriksson |

(Continued)

OTHER PUBLICATIONS

"Rizvandi, On Using Pattern Matching Algorithms in MapReduce Applications, 2011, IEEE" (Year: 2011).*

(Continued)

*Primary Examiner* — Ario Etienne
*Assistant Examiner* — Kidest Mendaye
(74) *Attorney, Agent, or Firm* — Culhane PLLC; Stephen J. Weed (57) ABSTRACT

Systems, devices, media, and methods are presented for assigning configuration parameters to unknown devices by comparing characteristics of unknown devices to characteristics of known devices. Characteristics of an unknown device are compared to characteristics of known devices to identify a similar device having known configuration parameters. The unknown devise is then assigned the configuration parameters of the identified similar device.

20 Claims, 8 Drawing Sheets

(56) References Cited

U.S. PATENT DOCUMENTS

| | | |
|---|---|---|
| 2003/0046189 A1 | 3/2003 | Asayama |
| 2009/0119256 A1* | 5/2009 | Waters ................ H04L 41/5064 |
| 2010/0066983 A1 | 3/2010 | Jun et al. |
| 2011/0173247 A1 | 7/2011 | Hubbard et al. |
| 2013/0139263 A1* | 5/2013 | Beyah ................ H04L 63/1408 726/23 |
| 2013/0267255 A1 | 10/2013 | Liu et al. |
| 2015/0074656 A1 | 3/2015 | Eramian |
| 2015/0193651 A1 | 7/2015 | Gleim et al. |
| 2016/0062867 A1 | 3/2016 | Rodriguez et al. |
| 2016/0098561 A1* | 4/2016 | Keller .................. G06F 21/566 726/24 |
| 2016/0173321 A1 | 6/2016 | Gukal et al. |
| 2016/0283853 A1 | 9/2016 | Lee et al. |
| 2016/0321594 A1 | 11/2016 | Linde et al. |
| 2017/0118510 A1 | 4/2017 | Stathacopoulos et al. |
| 2017/0206707 A1* | 7/2017 | Guay .................... H03M 7/30 |
| 2017/0250879 A1 | 8/2017 | Chadha et al. |
| 2017/0261949 A1 | 9/2017 | Hoffmann et al. |
| 2017/0288965 A1 | 10/2017 | Cebere |
| 2017/0317905 A1 | 11/2017 | Schimmelpfeng et al. |
| 2018/0032418 A1 | 2/2018 | Wang et al. |
| 2018/0191593 A1 | 7/2018 | Knijf et al. |
| 2018/0350015 A1 | 12/2018 | Gordon et al. |
| 2018/0367560 A1 | 12/2018 | Mahaffey et al. |
| 2019/0020659 A1 | 1/2019 | Loni et al. |
| 2019/0042303 A1 | 2/2019 | Chen et al. |
| 2019/0096280 A1 | 3/2019 | Saunders et al. |
| 2019/0114417 A1 | 4/2019 | Subbarayan et al. |
| 2019/0215227 A1 | 7/2019 | Bonanni et al. |
| 2019/0230474 A1 | 7/2019 | Lanes et al. |
| 2020/0067777 A1 | 2/2020 | Tandel et al. |
| 2020/0067919 A1 | 2/2020 | Patwardhan et al. |
| 2020/0118039 A1 | 4/2020 | Kocberber et al. |
| 2022/0052918 A1 | 2/2022 | Cieslak et al. |

OTHER PUBLICATIONS

Rizvandi et al. "On Using Pattern Matching Algorithms in MapReduce Applications", 2011, IEEE (Year: 2011).

J.A. Mathew et al., "Analysis and Development of Java Grande Benchmarks," 1999, ACM, 72-80 (Year: 1999).

Unpublished U.S. Appl. No. 16/382,365 to Cieslak et al. filed Apr. 12, 2019 entitled Benchmarking To Infer Configuration of Similar Devices (ANON-168).

Unpublished U.S. Appl. No. 16/385,305 to Cieslak et al. filed Apr. 16, 2019 entitled Network Device Performance Metrics Determination. (ANON-169).

* cited by examiner

DEVICE CONFIGURATION PARAMETER DETERMINATION

CROSS-REFERENCE TO RELATED APPLICATIONS

This application is a Continuation of U.S. application Ser. No. 16/418,135 filed on May 21, 2019 the contents of which is incorporated fully herein by reference.

TECHNICAL FIELD

Examples set forth in this disclosure relate generally to applications running on client devices and server systems supporting those devices. More particularly, but not by way of limitation, this disclosure addresses systems and methods for determining configuration parameters for client devices having unknown device types in order to enhance user experiences.

BACKGROUND

Performance of an application, conventionally referred to as an app, that runs on a client device varies from device to device. There are currently over 25,000 client devices operable on the Android® platform, and over 60 client devices operable on the iOS® platform. Performance of an application is affected by the hardware and software of the client device running the application.

BRIEF DESCRIPTION OF THE DRAWINGS

The disclosed subject matter is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. To easily identify the discussion of any particular element or act, the most significant digit or digits in a reference number refer to the figure number in which that element is first introduced. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION

Aspects of the subject matter disclosed herein are directed to determining configuration parameters for unknown devices based on device characteristics. Device characteristic capture applications for detecting device characteristics are distributed to the client devices (e.g., as part of an application such as a social media application). The device characteristics for unknown devices are then received and compared to device characteristics of known devices and configuration parameters of one or more known devices are assigned to the unknown devices having similar device characteristics.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

In accordance with one example, a method is provided for determining device configuration parameters. The method includes distributing, by a server system, a device characteristic capture application to a plurality of client devices, the device characteristic capture application associated with an application on the plurality of client devices, the device characteristic capture application configured to attain device characteristics of each client device; receiving, by the server system, the attained device characteristics of the plurality of client devices; comparing, by the server system, the device characteristics of a client device having an unknown device type to the device characteristics of client devices having known device types; and assigning, by the server system, to the client device having the unknown device type configuration parameters of one of the client devices having the known device types according to similarity of the device characteristics of the client device having the unknown device type to the device characteristics of each of the client devices having the known device types.

In accordance with another example, a system is provided for determining device configuration parameters. The system includes a memory that stores instructions and a processor configured by the instructions to perform operations. The operations performed by the processor includes distributing a device characteristic capture application to a plurality of client devices, the device characteristic capture application associated with an application on the plurality of client devices, the device characteristic capture application configured to attain device characteristics of each client device; receiving the attained device characteristics of the plurality of client devices; comparing the device characteristics of a client device having an unknown device type to the device characteristics of client devices having known device types; and assigning to the client device having the unknown device type configuration parameters of one of the client devices having the known device types according to similarity of the device characteristics of the client device having the unknown device type to the device characteristics of each of the client devices having the known device types.

In accordance with another example, a non-transitory processor-readable storage medium is provided that stores processor-executable instructions that, when executed by a processor of a machine, cause the machine to perform operations. The operations performed by the machine include distributing, by a server system, a device characteristic capture application to a plurality of client devices, the device characteristic capture application associated with an application on the plurality of client devices, the device characteristic capture application configured to attain device characteristics of each client device; receiving, by the server system, the attained device characteristics of the plurality of client devices; comparing, by the server system, the device characteristics of a client device having an unknown device type to the device characteristics of client devices having known device types; and assigning, by the server system, to the client device having the unknown device type configuration parameters of one of the client devices having the known device types according to similarity of the device characteristics of the client device having the unknown device type to the device characteristics of each of the client devices having the known device types.

Figure 1:
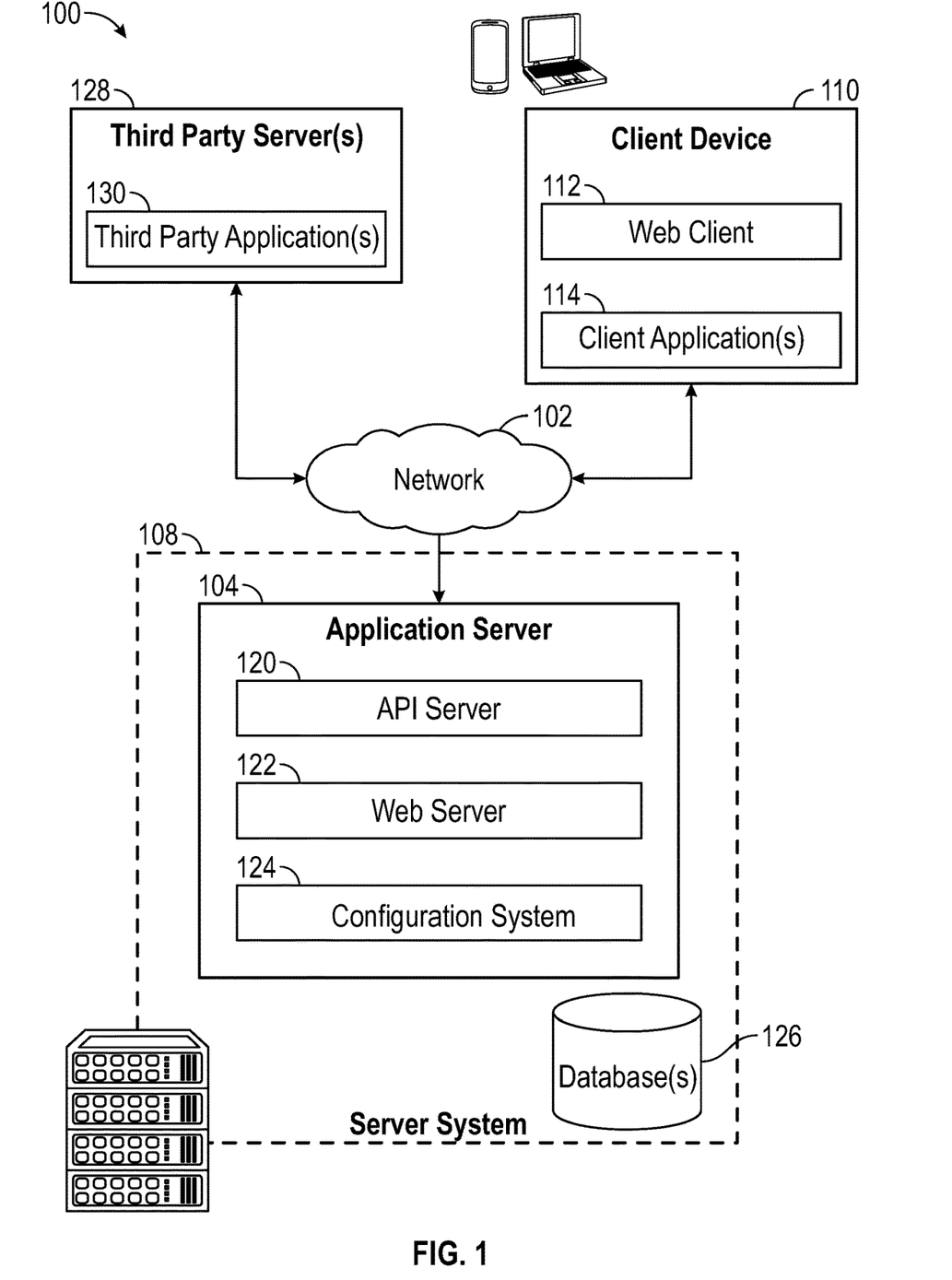
FIG. 1 is a block diagram of an example configuration system in an online client-server system.

FIG. 1 is a block diagram illustrating a system 100, according to some examples, configured to assign configuration parameters to devices having unknown device types. The system 100 includes one or more client devices such as client device 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform. For example, the client device 110 may be used to input information to create an account, exchange information over a network 102, and so forth.

For example, client device 110 may be a device of a user who is using a social media application on the device. Client device 110 may call a server for a social platform (e.g., hosted by server system 108) via the social media application directly or through one or more third-party servers 128 (e.g., utilizing one or more third-party applications 130). Application server 104 tracks information regarding client devices (e.g., make, model number, central processing unit (CPU) type, graphics processing unit (GPU) type, associated device characteristics, etc.) as a dataset in database 126. By analyzing the dataset using techniques disclosed herein, the application server 104 is able to automatically assign configuration parameters to devices having an unknown device type.

The components of a client device 110 impact the experience a user has when interacting with a social media platform. Current, expensive state-of-the-art client devices are able to handle complex calculations and image rendering much better than older and/or less expensive client devices. Meanwhile, users continually want new and improved features that require ever increasing processing resources. In order to address these demands, while providing acceptable performed on less powerful client devices, an application may be set up with feature levels (e.g., 0-5) corresponding to one or more features. If a device is a state-of-the-art device type, that device may be categorized to offer level 5 features of an application. On the other hand, if a device is older device type, it may be categorized to over level 2 feature levels for certain features and level 3 feature levels for other features. There are over 25,000 different client device types accessing social media platforms. Due to the number of device types, manually assigning configuration parameters is not practical. The inventors discovered that client devices having unknown device types can deliver an appropriate user experience if they are configured in the same or similar manner as devices with known device types having similar characteristics (e.g., same CPU, same GPU, etc.).

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 128, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, another type of network, or a combination of two or more such networks.

The client device 110 may access the various data and applications provided by other entities in the system 100 via web client 112 (e.g., a browser) and/or one or more client applications 114. The client device 110 may include one or more client application(s) 114 (also referred to as "apps") such as, but not limited to, a web browser, messaging application, electronic mail (email) application, an e-commerce site application, a mapping or location application, a device characteristic collection application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third party server(s) 128, and one or more client devices 110. The server system 108 includes an application program interface (API) server 120, a web server 122, and a configuration system 124, that may be communicatively coupled with one or more database(s) 126. The one or more database(s) 126 may be storage devices that store data (e.g., in a dataset) related to users of the server system 108, applications associated with the server system 108, cloud services, housing market data, and so forth. The one or more database(s) 126 may further store information related to third party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application. In one example the server system 108 includes a configuration system 124. Configuration system 124 may include one or more servers and may be associated with a cloud-based application. Configuration system 124 may distribute device characteristic capture applications (e.g., as part of a social media application or update thereto) to client devices, obtain device characteristics from those client devices, and store those results in database(s) 126. The configuration system 124 analyzes a dataset including the device characteristics from the client devices to configure client devices of an unknown type with configuration parameters of devices having a known type.

The system 100 further includes one or more third party server(s) 128. The one or more third-party server(s) 128 may include one or more third-party application(s) 130. The one or more third-party application(s) 130, executing on third party server(s) 128 may interact with the server system 108 via an API server 120 using a programmatic interface provided by the API server 120. For example, one or more of the third-party applications 130 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

As user herein, the term device characteristic capture application means an application configured to run on a client device to collect one or more device characteristics from a client device. Device characteristics include, by way of non-limiting example, a graphics processing unit (GPU) model number, a central processing unit (CPU) model number, a cellular class of service (e.g., 4G, LTE, 5G, etc.), and software APIs that are supported. Multiple device characteristic capture applications may be used to assess multiple device characteristics. The device characteristic capture application may be incorporated into another application on the client device (e.g., a social media application) or may be a standalone application. In one example, the device characteristic capture application is binary machine language instructions (i.e., native code) running directly on the CPU/GPU. In another example, the device characteristic capture application is a Java application and results are reported using an on-device portal (ODP).

In an example, a configuration database includes the characteristics of a device, e.g., name and characteristic data. The name attribute is a descriptive name string type for devices sharing the same underlying processing resources. The characteristic attribute is a multi-faceted data type (e.g., operating system, GPU model number, CPU model number, cellular class of service, application version, etc.).

Figure 2A:
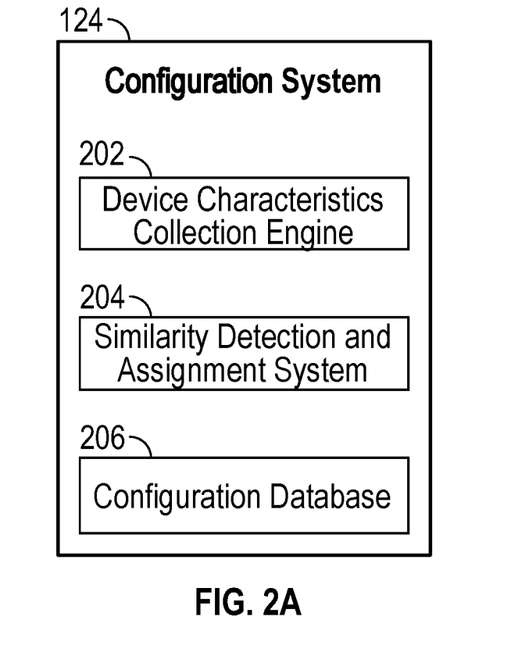
FIG. 2A is a block diagram illustrating an example configuration system.

FIG. 2A is a block diagram illustrating an example of the configuration system 124. The configuration system 124 includes a device characteristic collection engine 202, a similarity detection and assignment system 204, and a configuration database 206. The configuration database 206 is stored in the database 126 of the server system 108. The device characteristic collection engine 202 and the device inference engine runs on the application server 104 of the server system 108.

The device characteristic collection engine 202 is configured to distribute device characteristic capture applications and to collect corresponding device characteristics. Device characteristics are stored by device characteristic collection engine 202 in configuration database 206.

The similarity detection and assignment system 204 is configured to analyze device characteristics and determine which device(s) of a known type are most similar to a device of an unknown type. The similarity detection and assignment system 204 develops signatures based on device characteristics received from client devices, compares the signatures of devices having an unknown type to signatures of devices having a known type, and assigns configuration parameters from devices of a known type to devices of an unknown type that are most similar. In an example, the similarity detection and assignment system applies fuzzy logic to compare a signature of a device having multiple dimensions (e.g., each dimension representing a different characteristic such as CPU model and GPU model) with signatures of other devices to determine similarity between the signatures.

Figure 2B:
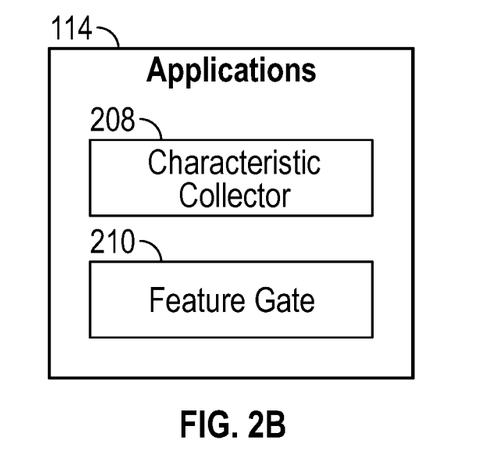
FIG. 2B is a block diagram illustrating example components for collecting device characteristics and for feature gating on a device.

FIG. 2B is a block diagram illustrating an example of the client applications 114. The client applications 114 include a characteristic collector 208 and a feature gate 210. The characteristic collector 208 communicates with processing systems within the client device 110, e.g., to determine when the client device 110 is performing other tasks, is in a charging state, is in a WiFi state, is in a battery level state, etc. The characteristic collector 208 launches device characteristic capture applications, assembles device characteristics, and transfers device characteristics to the configuration system 124 of the server system 108.

The feature gate 210 controls whether a feature of an application (e.g., a social media application) is offered on a device and the level of functionality for that feature. For example, multiple features within an application may each have an associated feature level (e.g., from 0 to 5 with a zero representing that the feature is off and a 5 representing fully functional). Example feature levels include how many points of focus are presented for an image, how many images are being simultaneously loaded in background processing while viewing a current image, whether images are presented for corresponding text, and how many areas within a video image are simultaneously being tracked for detected facial features. The feature gate 210 receives communications from the server system 108 for setting the feature levels.

Figure 3:
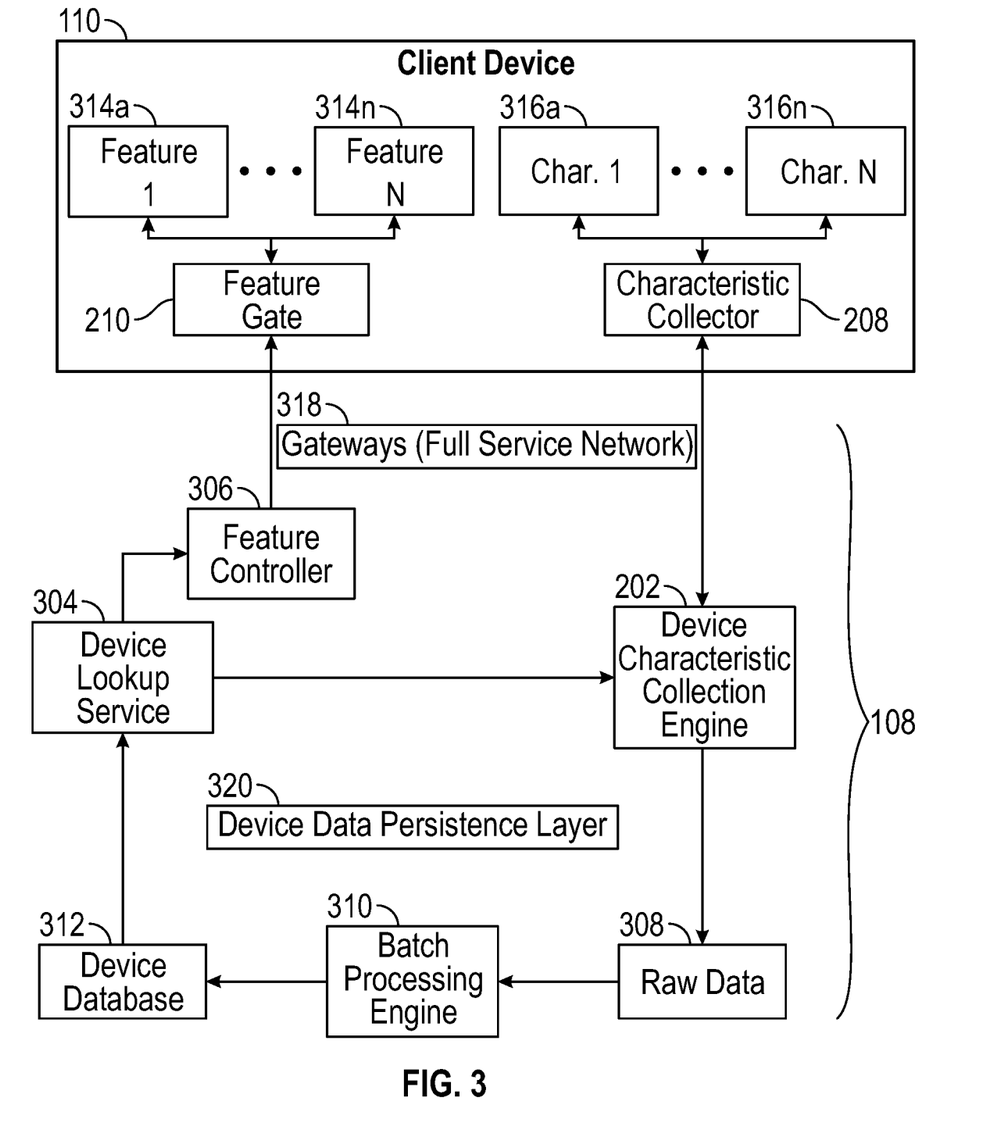
FIG. 3 is a block diagram illustrating server and client components for implementing collection of device characteristics, determining configuration parameters for unknown devices, and feature gating.

FIG. 3 depicts an example of the server system 108 and the client device 110 components for implementing characteristic determination, assignment of configuration parameters, and feature gating. A device characteristic collection engine 202 communicates with the characteristic collector 208 of the client devices 110 to distribute device characteristic capture applications and collect device characteristics. Additionally, the device characteristic collection engine 202 stores raw data 308 (e.g., in a database 126) received from the client devices 110 in the device data persistence layer 320 for processing. The device data persistence layer 320 is a software layer for passing communication between the application layer and the data storage devices (e.g., device database 312 in database 126). The device characteristic collection engine 202 is coupled to device lookup service 304 (which maintains a table of device information) to determine what information is missing for a given device.

The device lookup service 304 is responsible for making the application usable across many different client devices, regardless of their device characteristics. In an example, the device lookup service 304 stores a table (e.g., in database 126) containing a device identifier field (e.g., model number), a category field (e.g., category 0-5), and one or more configuration parameters fields. Each category represented in the category field is associated with one or more features levels for features being offered by the application. The device lookup service 304 is able to provide appropriate feature levels to a device (e.g., via a feature controller 306 to a feature gate 210) based on the category in which the device is categorized. It is contemplated that if insufficient configuration information is available, the category field will be blank or will default to a category with a particular feature level (e.g., feature level 3). In other words, the system provides default values for devices where a consensus is not reached for a value on a configuration parameter or capability.

The feature controller 306 communicates with the device lookup service 304 and the feature gate 210 of the client device 110. The feature controller 306 is configured to gate features based on if a feature is supported on a particular client device 110 and if the feature will perform well via assigned configuration parameters.

The batch processing engine 310 processes the raw data 308 and stores it in the device database 312. The processing includes filtering the raw data 308 and performing analysis to build the device database 312. In an example, the batch processing engine 310 computes device clusters, builds a device capabilities map based on device characteristics for a given model of device, and assigns configuration parameters (e.g., based on device characteristics). The results are stored in the device database 312.

Client devices 110 communicate with the server system 108 through a network gateway 318 (e.g., via the Internet). In an example, the gateway 318 is a full-service network gateway.

Characteristic calculator 208 communicates with device characteristic collection engine 202 from which it receives requests, which triggers communication of one or more characteristics (Characteristic 1 316a to Characteristic N 316n) gathered by the client device 110. The characteristic collection 208 is configured to gather characteristics at times that do not impact the user experience with the application (e.g., by detecting when various components are at rest or the client device is charging, and gathering characteristic information during this time).

The feature gate 210 communicates with the feature controller 306. The feature gate 210 is configured to turn on/off and/or set the level of features (Feature 1 314a to Feature N 314n) within the application in order to gate features based on if a feature is supported on a device and if the feature will perform well via correlated device characteristics produced by device characteristic capture applications. The feature gate 210 may have a default feature setting for an unknown client device 110 prior to being configured with configuration parameters of a similar known client device.

Figure 4:
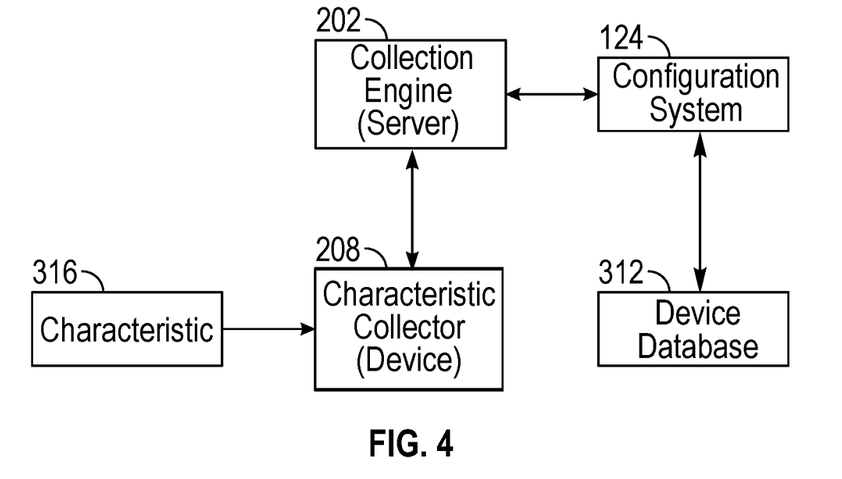
FIG. 4 is a block diagram illustrating an implementation for collecting device characteristics.

FIG. 4 depicts an example for collecting device characteristics of client devices. In the example, the configuration system 124 monitors client devices, identifies client devices (e.g., based on model number), and stores characteristics and configuration parameters associated with identified client devices in a device database 312. Devices for which configuration parameters are present are referred to herein as known devices and devices for which one or more configuration parameters are not present are referred to as unknown devices.

The configuration system 124 periodically queries device database 312 to identify one or more devices for which characteristics and/or configuration parameters are not available. Configuration system 124 reports a device identifier (e.g., model number) to collection engine 202 when an unknown device is identified in the server system 108 (e.g., by device characteristic collection engine 202).

In an example, the collection engine 202 requests characteristics from the characteristic collector 208 in a configuration synchronization (config sync) response. The characteristic collector 208 initiates the process by sending a configuration sync request to the collection engine 202. The collection engine 202 identifies device characteristics needed from the client device 110 (e.g., by querying device lookup service 304) and sends a request for the needed data in the config sync response to the characteristic collector 208. A repeated enumerated type (enum) field may be added to the config sync response to indicate a needed characteristic.

The characteristic collector 208 identifies a needed device characteristic from the config sync response and sets a corresponding collection flag in memory. If the characteristic collector 208 has the characteristic, it communicates the characteristic to the collection engine 202 and clears the corresponding collection flag. If the characteristic collector 208 does not have the characteristic, it executes a characteristic capture application configured to retrieve the characteristic, communicates the characteristic upon retrieval to the collection engine 202, and clears the flag. The characteristic collector 208 executes the characteristic capture application(s) at a time identified to have minimal impact on the user (e.g., while the client device 110 is charging, when the client device is idle, etc.). The characteristic collector 208 stores the results of the device characteristic capture application(s) for return to the collection engine 202 in a subsequent config sync request. A protocol type (proto) field may be added in the subsequent config sync request for returning the results. When the characteristic collector 208 prepares a config sync request, it looks up the device characteristics, attaches data representing the characteristic in the request, and clears the corresponding collection flag.

When the collection engine 202 receives a config request with attached device characteristics, it writes the results to the device database 312.

The delay between a device characteristic request and response can be hours or days for a given user. To avoid asking all the users of a device model for device characteristics, the server can increment a Memcached backed counter. When a characteristic has been requested for a device type, the server stops requesting that characteristic from that device type when a threshold (e.g. 100 per device model per day) has been reached. Additionally, a per-user Boolean in memcache indicates if a device characteristic has already been requested for the user on that day. The in memcache may be checked before sending a request in order to avoid resending the same request to the same client device over and over.

Figure 5:
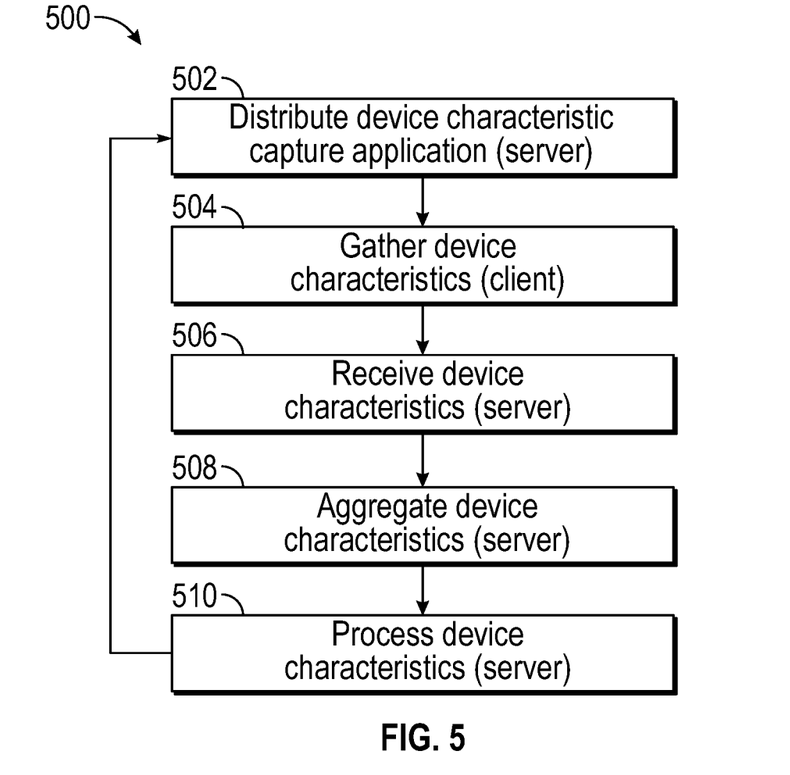
FIG. 5 is a flow diagram illustrating an example method for determining configuration parameters for unknown client devices.
Figure 6:
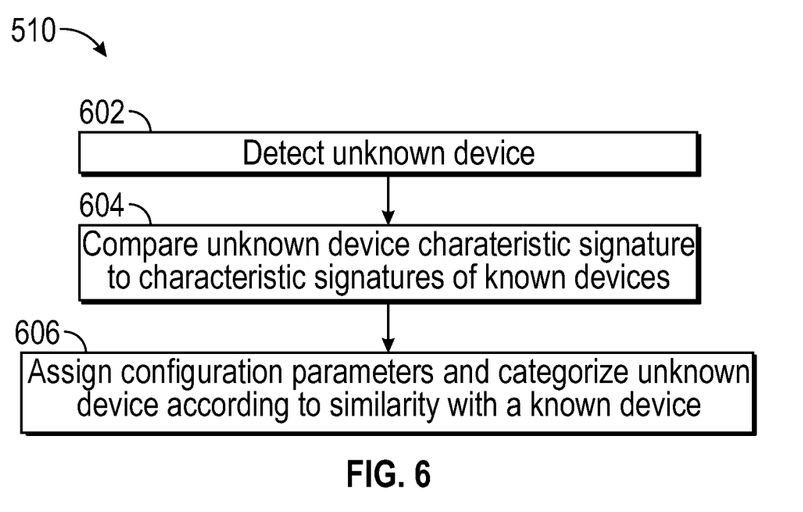
FIG. 6 is a flow diagram illustrating an example method for assigning configuration parameters and categorizing unknown devices based on device characteristics.
Figure 7:
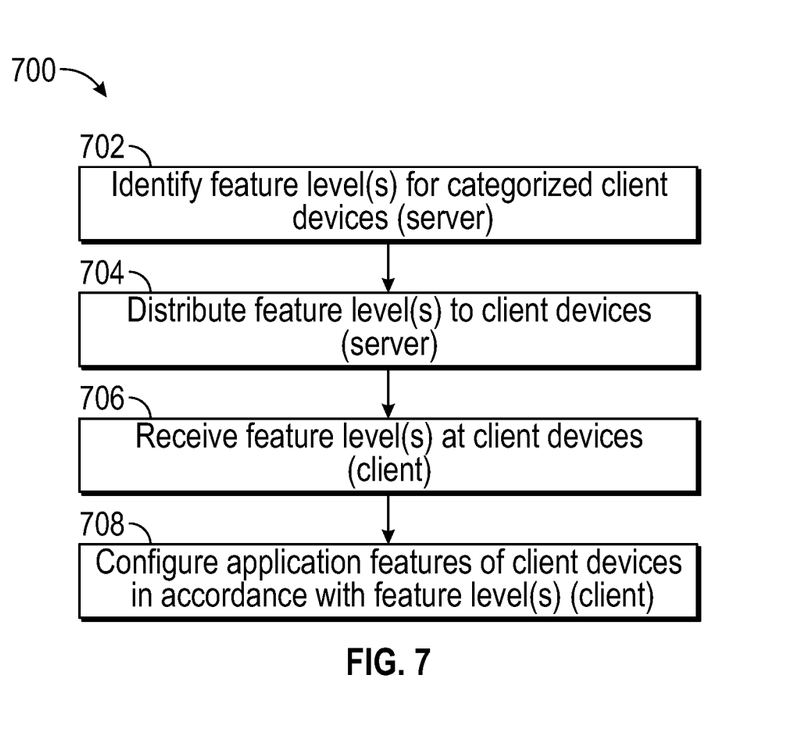
FIG. 7 is a flow diagram illustrating an example method for configuring application features of client devices in accordance with feature levels determined through the configuration of unknown devices.

FIG. 5 is a flow diagram illustrating an example method 500 for capturing and processing device characteristics, FIG. 6 is a flow diagram illustrating an example method 510 for processing device characteristics to assign configuration parameters and categorize devices based on assigned configuration parameters of an unknown device in the processing block of FIG. 5, and FIG. 7 is a flow diagram of an example method 700 for configuring application features. Although the below description of the methods refers to the configuration system 124, other systems for capturing and processing device characteristics, assigning configuration parameters to unknown devices, and categorizing unknown devices based on device characteristics will be understood from the description herein. The flowcharts may describe the operations as a sequential process, however, many of the operations can be performed in parallel or concurrently. In addition, the order of the operations may be re-arranged. A process is terminated when its operations are completed. A process may correspond to a method, a procedure, etc. The steps of a method may be performed in whole or in part, may be performed in conjunction with some or all of the steps in other methods, and/or may be performed by any number of different systems, such as the systems described in FIGS. 1, 2A, 2B, 3, 4, and 8-10.

At block 502, the server system 108 distributes the device characteristic capture applications. The server system 108 may distribute the device characteristic capture applications, e.g., as part of an application (e.g., a social media application). Additionally, the server system may distribute requests for missing device characteristics. In an example, the device look-up service 304 periodically scans a table maintained by the device look-up service (e.g., in database 126) to identify devices (e.g., identified by model number) having incomplete device characteristics. The device lookup service 304 then communicates a device identifier and an indicator corresponding to the missing information to the device characteristic collection engine 202, which distributes requests for the missing characteristics to the characteristic collector 208.

At block 504, the client device 110 gathers device characteristics. The client device 110 gathers the device characteristics by executing the device character capture applications. In an example, the device characteristic capture applications are configured to automatically gather device characteristics. In another example, the device characteristic capture applications are configured to run in response to requests from the collection engine 202. The characteristic collector 208 of the client device 110 may schedule the device characteristic capture applications for execution when a request for a device characteristic is received from the server system 108, e.g., as described above with reference to FIG. 4.

At block 506, the server system 108 receives the device characteristics. The device characteristic collection engine 202 of server system 108 receives the device characteristics, e.g., as described above with reference to FIG. 4.

At block 508, the server system 108 aggregates the device characteristic results. The batch processing engine 310 may aggregate the device characteristic results based on device type and store the aggregated results in the device database 312.

At block 510, the server system 108 processes the device characteristics. The batch processing engine 310 processes the device characteristics, e.g., to compute device clusters, builds a device capabilities map based on device characteristics for a given model of device, and assigns configuration parameters (e.g., based on device characteristics). The processed results may be stored in the database 126.

The server system 108 may process the device characteristics in accordance with the method depicted in FIG. 6. At block 602, the server system 108 detects an unknown device. An unknown device (or group of devices) is a device for which one or more characteristic are not yet available. Thus, the unknown device may be detected by reviewing a device characteristic field or a categorization field based on device characteristics in a table maintained by the device lookup service 304. The unknown device (or group of devices) may be referenced using its model number.

At block 604, the server system 108 compares a signature of the unknown device (e.g., based on characteristics of the device) to signatures of known devices. The device lookup service 304 may apply a principal component analysis or a fuzzy comparison algorithm to compare the signature of the unknown device to the signatures of the known devices.

At block 606, the server system 108 assigns configuration parameters and categorizes the unknown devices according to signature similarity with a known device (e.g., with a device already having complete device characteristics and/or a complete category field stored in the table maintained by the device lookup service 304).

The sever system 108 may utilize the categorized device information to configure an application on the unknown client device according to the method of FIG. 7.

At block 702, the server system 108 identifies feature levels for categorized client device 110. The feature controller 306 receives a device type identifier (e.g., model number) from the device look-up service 304 and associated feature levels.

At block 704, the server system 108 distributes feature levels to the client device 110. The feature controller 306 distributes the feature levels to the feature gate 210 of the appropriate client device, e.g., identified based on model number.

At block 706, the client device 110 receives the feature levels. The feature gate 210 receives the feature levels from the feature controller 306. The feature levels may be communicated using the config sync request/reply as described above for the device characteristic collection with reference to FIG. 4.

At block 708, the client device 110 configures features of the application in accordance with the received feature levels. The client device 110 configures features levels within the application that are preconfigured to be turned on/off and/or set to a particular level.

Figure 8:
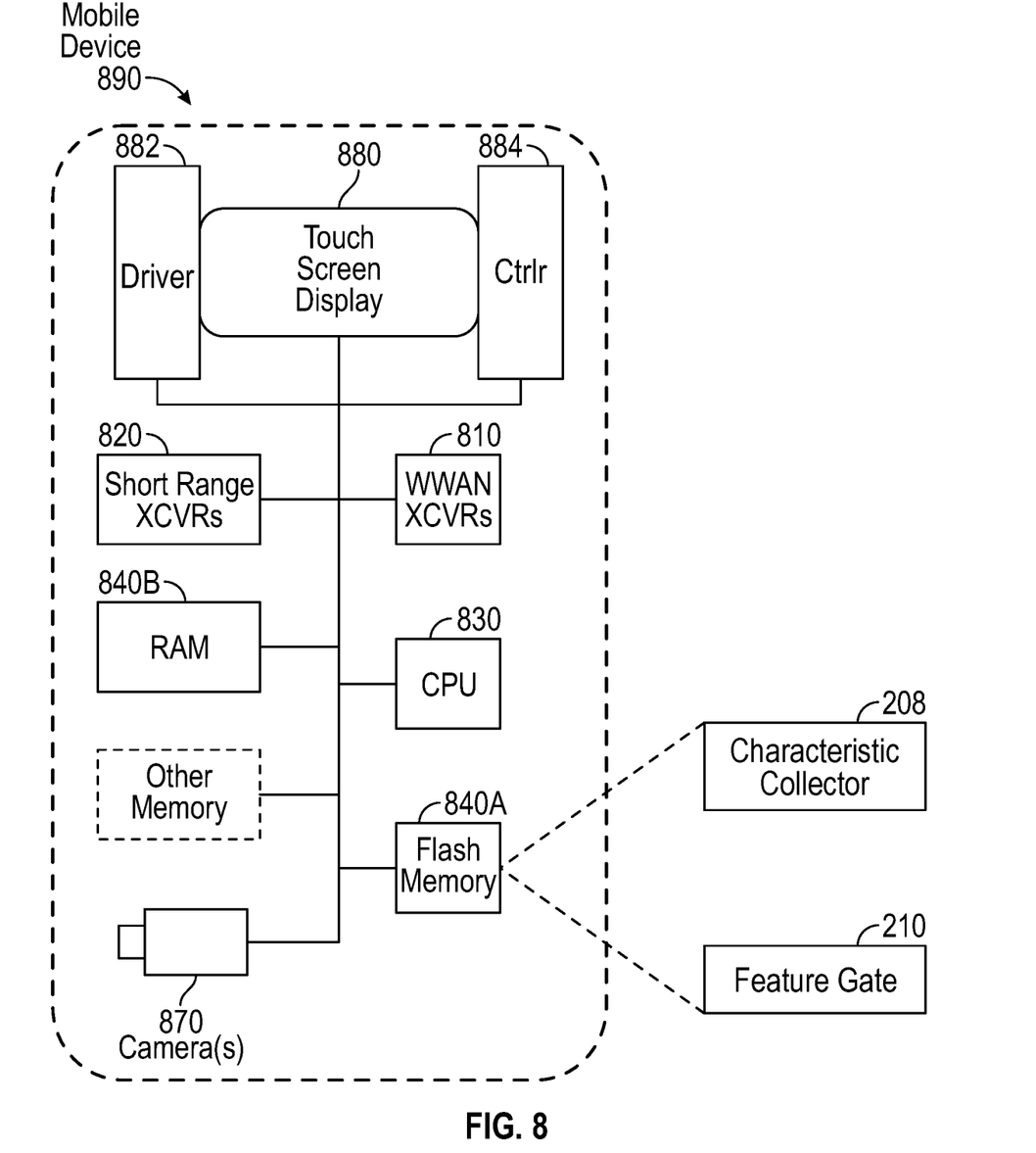
FIG. 8 is a diagrammatic representation of an example hardware configuration for a client device embodied as a mobile device.

FIG. 8 is a high-level functional block diagram of an example client device 110 embodied as an example mobile device 890 that includes the characteristic collector 208 and the feature gate 210. Mobile device 890 includes a flash memory 840A which includes programming to perform all or a subset of the functions described herein for the characteristic collector 208 and the feature gate 210. Mobile device 890 can include a camera 870 that comprises at least two visible light cameras (first and second visible light cameras with overlapping fields of view) or at least on visible light camera and a depth sensor with substantially overlapping fields of view. Memory 840A may further include multiple images or video, which are generated via the camera 870.

As shown, the mobile device 890 includes an image display 880, an image display driver 882 to drive the image display 880, and a controller 884 to control the image display 880. In the example of FIG. 8, the image display 880 and a user input device are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 8 therefore provides block diagram illustrations of the example mobile device 890 having a touch screen display for displaying content and receiving user input as (or as part of) the user interface.

As shown in FIG. 8, the mobile device 890 includes at least one digital transceiver (XCVR) 810, shown as WWAN XCVRs, for digital wireless communications via a wide area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the mobile device 890 over one or more network connections via XCVRs 810, 820.

The transceivers 810, 820 (network communication interface) conform to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 890.

The mobile device 890 further includes a microprocessor, shown as CPU 830, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 890 by configuring the mobile device 890 to perform various operations, for example, in accordance with instructions or programming executable by processor 830. For example, such operations may include various general operations of the mobile device, as well as operations related to the programming for the configuration inference scheduler 208 and the feature gate 210. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications, including programming for the configuration inference scheduler 208 and the feature gate 210 are executed. Applications, such as device characteristic capture applications and programming for the configuration inference scheduler 208 and the feature gate 210, may be a native application, a hybrid application, or a web application (e.g., a dynamic web page executed by a web browser) that runs on mobile device 890. Examples of mobile operating systems include Google Android, Apple iOS (I-Phone or iPad devices), Windows Mobile, Amazon Fire OS, RIM BlackBerry operating system, or the like.

Figure 9:
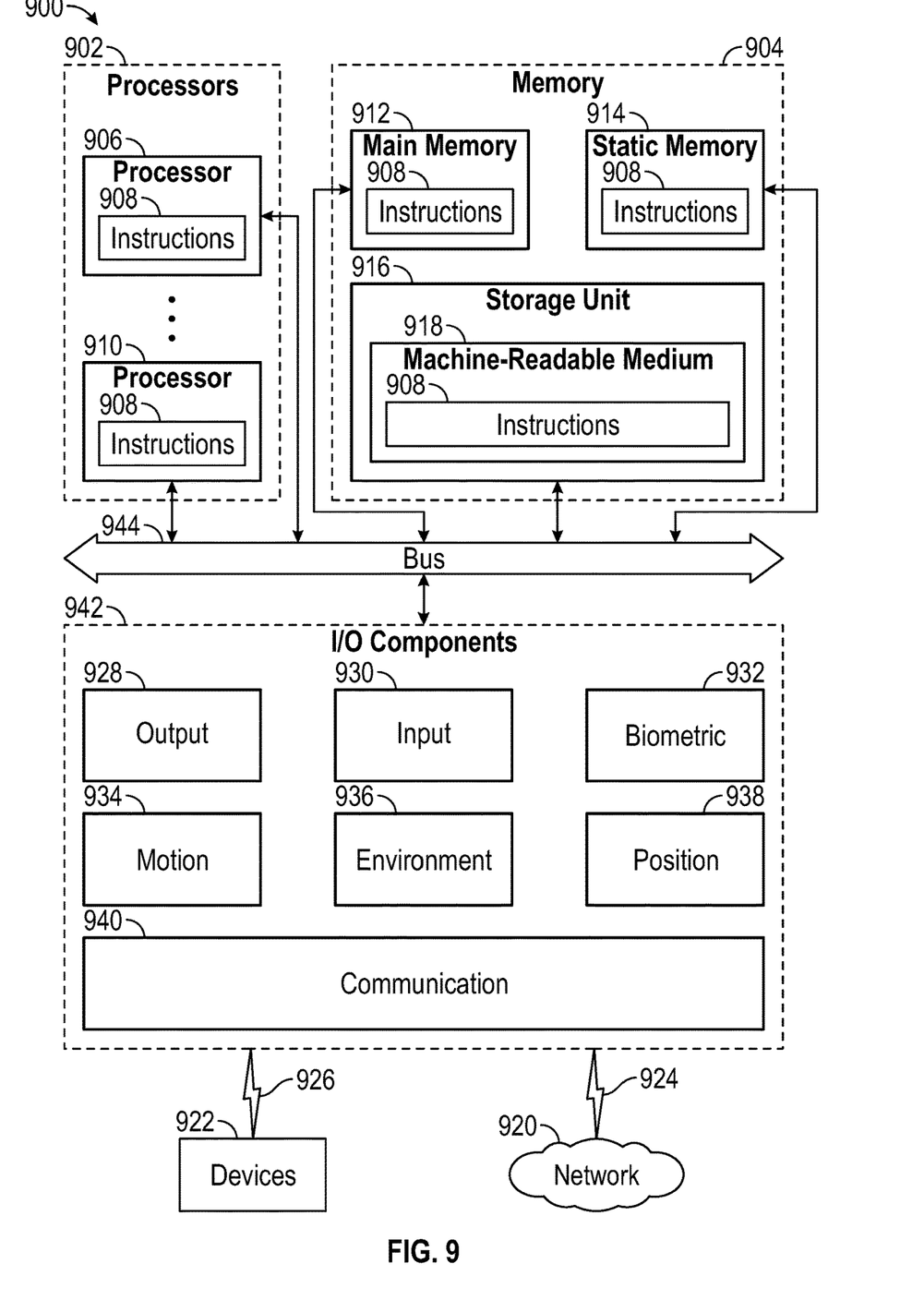
FIG. 9 is a diagrammatic representation of a machine in the form of a computer system within which a set of instructions may be executed for causing the machine to perform any one or more of the methodologies described herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
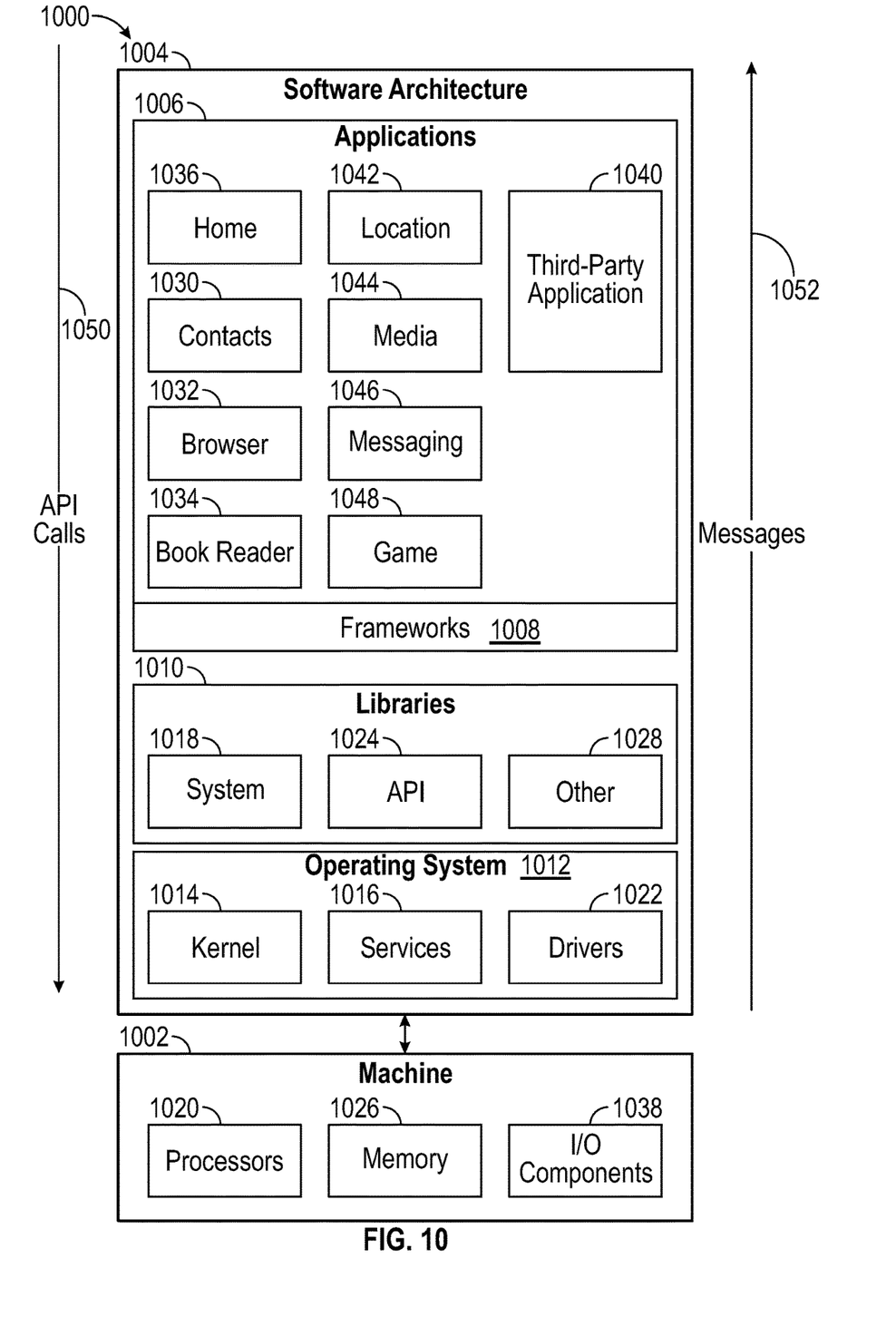
FIG. 10 is block diagram showing a software architecture within which aspects of the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method for determining device configuration of a client device, the method comprising:
   distributing, by a server system, a device characteristic capture application to a plurality of client devices, the device characteristic capture application associated with an application on the plurality of client devices, the device characteristic capture application configured to attain device characteristics of each client device;
   receiving, by the server system, the attained device characteristics of the plurality of client devices;
   comparing, by the server system, the attained device characteristics of a client device having an unknown device type to the device characteristics of client devices having known device types;
   assigning, by the server system, the client device having the unknown device type into one of a plurality of features categories associated with one of the client devices having the known device types according to similarity of the attained device characteristics of the client device having the unknown device type to the device characteristics of the one of the client devices having the known device types, each features category associated with one or more features of the application and each feature having a feature level selected from a plurality of feature levels;
   identifying the one or more feature levels associated with the assigned features category for the unknown client device; and
   distributing the identified one or more feature levels to the unknown client device for configuring features of the application on the unknown client device.

2. The method of claim 1, wherein the comparing comprises:
   generating a signature from the device characteristics of the client device having the unknown device type; and
   comparing the signature to signatures of the client devices having known device types;
   wherein the assigning assigns device configuration parameters to the client device having the unknown device type responsive to comparing the signatures.

3. The method of claim 2, wherein the signature is a multi-dimensional signature and the comparing identifies a closest match in a multi-dimensional space.

4. The method of claim 2, wherein the comparing the signature to the signatures comprises applying principal component analysis.

5. The method of claim 1, wherein the application comprises a social media application and the assigning comprises assigning device configuration parameters of the one of the client devices having the known device types to the client device having the unknown device type for more efficient processing of the social media application.

6. The method of claim 1, wherein the device characteristics include two or more of central processing unit (CPU) model number, graphics processing unit (GPU) model number, cellular capability level, or application version of the application.

7. The method of claim 1, further comprising storing device configuration parameters and the device characteristics of the known devices in a configuration database.

8. A system for determining device configuration of a client device, the system comprising:
   a memory that stores instructions; and
   a processor configured by the instructions to perform operations comprising:
   distributing, by a server system, a device characteristic capture application to a plurality of client devices, the device characteristic capture application associated with an application on the plurality of client devices, the device characteristic capture application configured to attain device characteristics of each client device;
   receiving, by the server system, the attained device characteristics of the plurality of client devices;
   comparing, by the server system, the attained device characteristics of a client device having an unknown device type to the device characteristics of client devices having known device types;
   assigning, by the server system, the client device having the unknown device type into one of a plurality of features categories associated with one of the client devices having the known device types according to similarity of the attained device characteristics of the client device having the unknown device type to the device characteristics of the one of the client devices having the known device types, each features category associated with one or more features of the application and each feature having a feature level selected from a plurality of feature levels;
   identifying the one or more feature levels associated with the assigned features category for the unknown client device; and
   distributing the identified one or more feature levels to the unknown client device for configuring features of the application on the unknown client device.

9. The system of claim 8, wherein the comparing comprises:
   generating a signature from the device characteristics of the client device having the unknown device type; and
   comparing the signature to signatures of the client devices having known device types;
   wherein the assigning assigns device configuration parameters to the client device having the unknown device type responsive to comparing the signatures.

10. The system of claim 9, wherein the signature is a multi-dimensional signature and the comparing identifies a closest match in a multi-dimensional space.

11. The system of claim 9, wherein the comparing the signature to the signatures comprises applying principal component analysis.

12. The system of claim 8, wherein the application on the plurality of client devices comprises a social media application and the assigning comprises assigning device configuration parameters of the one of the client devices having the known device types to the client device having the unknown device type for more efficient processing of the social media application.

13. The system of claim 8, further comprising:
a configuration database storing device configuration parameters and the device characteristics of the known devices;
wherein the processor is further configured by the instructions to store the device configuration parameters and the device characteristics of the known devices in the configuration database.

14. The system of claim 8, wherein the device characteristics include two or more of central processing unit (CPU) model number, graphics processing unit (GPU) model number, cellular capability level, or application version of the application.

15. A non-transitory processor-readable storage medium storing processor-executable instructions that, when executed by a processor of a machine, cause the machine to perform operations comprising:
distributing, by a server system, a device characteristic capture application to a plurality of client devices, the device characteristic capture application associated with an application on the plurality of client devices, the device characteristic capture application configured to attain device characteristics of each client device;
receiving, by the server system, the attained device characteristics of the plurality of client devices;
comparing, by the server system, the attained device characteristics of a client device having an unknown device type to the device characteristics of client devices having known device types;
assigning, by the server system, the client device having the unknown device type into one of a plurality of features categories associated with one of the client devices having the known device types according to similarity of the attained device characteristics of the client device having the unknown device type to the device characteristics of the one of the client devices having the known device types, each features category associated with one or more features of the application and each feature having a feature level selected from a plurality of feature levels;
identifying the one or more feature levels associated with the assigned features category for the unknown client device; and
distributing the identified one or more feature levels to the unknown client device for configuring features of the application on the unknown client device.

16. The non-transitory processor-readable storage medium of claim 15, wherein the instructions causing the machine to compare the device characteristics comprises:
generating a signature from the device characteristics of the client device having the unknown device type; and
comparing the signature to signatures of the client devices having known device types;
wherein the assigning assigns device configuration parameters to the client device having the unknown device type responsive to comparing the signatures.

17. The non-transitory processor-readable storage medium of claim 16, wherein the signature is a multi-dimensional signature and wherein the instructions further cause the machine to perform the comparing by identifying a closest match in a multi-dimensional space.

18. The non-transitory processor-readable storage medium of claim 16, wherein the instructions further cause the machine to perform the comparing by applying principal component analysis to compare the signature to the signatures.

19. The non-transitory processor-readable storage medium of claim 15, wherein the application comprises a social media application and the instructions further cause the machine to perform the assigning by assigning device configuration parameters of the one of the client devices having the known device types to the client device having the unknown device type for more efficient processing of the social media application.

20. The non-transitory processor-readable storage medium of claim 15, wherein the instructions further cause the machine to perform an operation comprising:
storing device configuration parameters and the device characteristics of the known devices in a configuration database, the device characteristics including two or more of central processing unit (CPU) model number, graphics processing unit (GPU) model number, cellular capability level, or application version of the application.

* * * * *